United States Patent
Yu et al.

(10) Patent No.: US 10,873,900 B2
(45) Date of Patent: Dec. 22, 2020

(54) METHOD FOR WIRELESS FIDELITY CONNECTION AND RELATED PRODUCTS

(71) Applicant: Guangdong Oppo Mobile Telecommunications Corp., Ltd., Guangdong (CN)

(72) Inventors: Yi Yu, Guangdong (CN); Shimin Jiang, Guangdong (CN); Yadong Hu, Guangdong (CN); Botao Cu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/535,850

(22) Filed: Aug. 8, 2019

(65) Prior Publication Data
US 2019/0364493 A1 Nov. 28, 2019

Related U.S. Application Data

(63) Continuation of application No. PCT/CN2017/103174, filed on Sep. 25, 2017.

(30) Foreign Application Priority Data

Feb. 20, 2017 (CN) .......................... 2017 1 0090717

(51) Int. Cl.
*H04L 12/50* (2006.01)
*H04W 48/16* (2009.01)
(Continued)

(52) U.S. Cl.
CPC ............ *H04W 48/16* (2013.01); *H04B 17/26* (2015.01); *H04W 64/003* (2013.01); *H04W 72/1247* (2013.01); *H04W 76/18* (2018.02)

(58) Field of Classification Search
CPC ....................................................... H04L 12/28
(Continued)

(56) References Cited

U.S. PATENT DOCUMENTS

| 8,041,319 B2 | 10/2011 | He et al. |
| 8,695,063 B2 | 4/2014 | Kholaif et al. |
| 2010/0039319 A1* | 2/2010 | Cameron ................ B66C 13/16 342/357.27 |

FOREIGN PATENT DOCUMENTS

| CN | 1722693 A | 1/2006 |
| CN | 102231887 A | 11/2011 |

(Continued)

OTHER PUBLICATIONS

European partial search report issued in corresponding European application No. 17896742.8 dated Dec. 16, 2019.
(Continued)

*Primary Examiner* — Dang T Ton (57) ABSTRACT

A method for Wi-Fi connection and related products are provided. The method includes obtaining X parameters of a target access point (AP), where the X parameters at least include a target service set identifier (SSID) of the target AP, and X is a positive integer. A Wi-Fi scan is performed according to the X parameters. In response to unsuccessful finding of the target AP, according to current network environment information, M Wi-Fi connection records are determined from historical Wi-Fi connection data, where each of the M Wi-Fi connection records contains an AP previously connected by a terminal, and M is a positive integer. A Wi-Fi scan is performed according to the target SSID and SSIDs in the M Wi-Fi connection records.

18 Claims, 7 Drawing Sheets

(51) Int. Cl.
  *H04B 17/26* (2015.01)
  *H04W 76/18* (2018.01)
  *H04W 64/00* (2009.01)
  *H04W 72/12* (2009.01)

(58) Field of Classification Search
  USPC .......................................................... 370/329
  See application file for complete search history.

(56) References Cited

FOREIGN PATENT DOCUMENTS

| | | |
|---|---|---|
| CN | 103826323 A | 5/2014 |
| CN | 104302015 A | 1/2015 |
| CN | 104782187 A | 7/2015 |
| CN | 105188056 A | 12/2015 |
| CN | 105657781 A | 6/2016 |
| CN | 106255106 A | 12/2016 |
| EP | 2509367 A1 | 10/2012 |
| EP | 2892282 A1 | 7/2015 |
| JP | 2016178689 A | 10/2016 |
| WO | 2006067595 A1 | 6/2006 |
| WO | 2014108765 A1 | 7/2014 |

OTHER PUBLICATIONS

International search report issued in corresponding international application No. PCT/CN2017/103174 dated Dec. 20, 2017.
Extended EP Search Report for European Application No. 17896742.8 dated Apr. 22, 2020.

* cited by examiner

METHOD FOR WIRELESS FIDELITY CONNECTION AND RELATED PRODUCTS

CROSS-REFERENCE TO RELATED APPLICATION(S)

This application is a continuation of International Application No. PCT/CN2017/103174, filed on Sep. 25, 2017, which claims priority to Chinese Patent Application No. 201710090717.3, filed on Feb. 20, 2017, both of which are incorporated herein by reference in their entireties.

TECHNICAL FIELD

This disclosure relates to the field of communications, and more particularly to a method for wireless fidelity (Wi-Fi®) connection and related products.

BACKGROUND

With rapid development of information technologies, terminals such as mobile phones and tablet computers become increasingly popular. User requirements on the terminals also become increasingly high. There is not only a need for a relatively high processing speed, but also an increasing dependence on Wi-Fi. With popularization of the terminals and Wi-Fi, it is frequent to connect the terminals to a Wi-Fi network.

Generally, the terminals may be normally connected to a hidden access point (AP) when a service set identifier (SSID), an encryption mode, and a password are all matched.

SUMMARY

Implementations of the present disclosure provide a method for Wi-Fi connection and related products.

According to a first aspect of the implementations of the present disclosure, a method for Wi-Fi connection is provided. The method includes the following. X parameters of a target access point (AP) are obtained, where the X parameters at least include a target service set identifier (SSID) of the target AP, and X is a positive integer. Wi-Fi scan is performed according to the X parameters. In response to unsuccessful finding of the target AP, M Wi-Fi connection records are determined according to current network environment information from historical Wi-Fi connection data, where each of the M Wi-Fi connection records contains an AP previously connected, and M is a positive integer. Wi-Fi scan is performed according to the target SSID and SSIDs in the M Wi-Fi connection records.

According to a second aspect of the implementations of the present disclosure, a terminal is provided. The terminal includes at least one processor and a computer readable storage. The computer readable storage is coupled to the at least one processor and stores at least one computer executable instruction thereon which, when executed by the at least one processor, causes the at least one processor to carry out following actions. X parameters of a target AP is obtained, where the X parameters at least include a target SSID of the target AP, and X is a positive integer. Wi-Fi scan is performed according to the X parameters. According to current network environment information, M Wi-Fi connection records are determined from historical Wi-Fi connection data in response to unsuccessful finding of the target AP, where each of the M Wi-Fi connection records contains an AP previously connected by the terminal, and M is a positive integer. Wi-Fi scan is performed according to the target SSID and SSIDs in the M Wi-Fi connection records.

According to a third aspect of the implementations of the present disclosure, a non-transitory computer readable storage medium is provided. The non-transitory computer readable storage medium stores at least one computer program which, when executed by at least one processor, causes the at least one processor to carry out following actions. Wi-Fi scan is performed at least according to a target SSID of a target AP to obtain a scan result. According to the scan result and historical Wi-Fi connection data, information of at least one AP previously connected by a terminal is determined, in response to unsuccessful finding of the target AP, where the information of the at least one AP contains an SSID. Wi-Fi scan is performed according to the target SSID and the SSID of the at least one AP.

BRIEF DESCRIPTION OF THE DRAWINGS

To describe technical solutions in implementations of the present disclosure more clearly, the following briefly introduces the accompanying drawings required for describing the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

In related arts, if a wrong SSID is input, a hidden AP that needs to be connected cannot be found, and thus efficiency of Wi-Fi connection is relatively low. To this end, implementations of the present disclosure provide a method for Wi-Fi connection and related products, which can improve the efficiency of connecting to a hidden AP in the case of inputting a wrong SSID.

Technical solutions of the present disclosure will be further described below through implementations with reference to the accompanying drawings. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", "third", "fourth", and the like used in the specification, the claims, and the accompany drawings of the present disclosure are used to distinguish different objects rather than describe a particular order. Further, the terms "include", "comprise", and "have" as well as variations thereof are intended to cover non-exclusive inclusion. For example, a process, method, system, product, or apparatus including a series of steps or units is not limited to the listed steps or units; on the contrary, it can optionally include other steps or units that are not listed; alternatively, other steps or units inherent to the process, method, product, or device can be included either.

"Implementation" mentioned in the present disclosure means that specific characteristics, structures, or properties described in connection with an implementation may be included in at least one implementation of the present disclosure. This word displayed at each position in the specification does not refer to the same implementation as well as an independent or alternate implementation mutually exclusive to other implementations. It may be explicitly and implicitly understood by those skilled in the art that the implementations described in the present disclosure may be combined with the other implementations.

A terminal described in the implementations of the present disclosure may include a smart phone (such as an Android® phone, an iOS® phone, and a Windows® phone), a tablet computer, a palmtop computer, a notebook computer, a mobile Internet device (MID), wearable equipment, or the like, which are not exhausted but only listed as examples. The terminal includes, but is not limited to, the listed terminals.

It is to be noted that, a target AP in the implementations of the present disclosure may be designated by a user. In the case that the target AP is a hidden AP, information such as an SSID, an encryption mode, a password, and other information of the target AP is input. When only the SSID is input, Wi-Fi scan can be performed according to the SSID to search an AP having an SSID the same as the SSID input. When only the SSID and the encryption mode are input, Wi-Fi scan can be performed according to the SSID and the encryption mode to search an AP having an SSID the same as the SSID input and an encryption mode the same as the encryption mode input. When the SSID, the encryption mode, and the password are input, Wi-Fi scan can be performed according to the SSID, the encryption mode, and the password to search an AP having an SSID the same as the SSID input, an encryption mode the same as the encryption mode input, and a password the same as the password input.

It is to be noted that, current network environment in the implementations of the present disclosure may be understood as network environment where a terminal is currently located. Current network environment information includes, but is not limited to, a current scan result (e.g., information of surrounding APs can be obtained through Wi-Fi scan, and the information of each of the APs includes, but is not limited to, a signal strength value, a position, an SSID, a basic service set identifier (BSSID), an encryption mode, etc.), a current position of the terminal, and the like.

It is to be noted that, historical Wi-Fi connection data in the implementations of the present disclosure may include multiple Wi-Fi connection records. Each Wi-Fi connection record may contain an AP previously connected by the terminal. Of course, each Wi-Fi connection record may also contain property information of the AP previously connected by the terminal, network environment information (e.g., a position of the terminal, a signal strength value and property information of each of surrounding APs, etc.), and the like. The property information of the AP previously connected or a surrounding AP may contain at least one of: an SSID, a BSSID, an encryption mode, a password, whether it is hidden (hidden or unhidden), and the like. Of course, each time the terminal is connected to an AP, a Wi-Fi connection record can be generated to record an SSID, a BSSID, an encryption mode, and a password of the AP, whether the AP is hidden or not, the position of the terminal, and so on. Further, the Wi-Fi connection record in the implementations of the present disclosure may further contain an AP not previously connected by the terminal. For example, the AP not previously connected by the terminal refers to an AP to which the terminal does not select to be connected, or an AP to which the terminal selects to be connected but failed to be connected. Taking a hidden AP a as an example, when performing Wi-Fi scan according to an SSID of A, although the hidden AP a can be found, the terminal cannot be connected to the hidden AP a due to a wrong password input. In this situation, a Wi-Fi connection record can be generated.

Hereinafter, implementations of the present disclosure will be described in detail.

According to an implementation of the disclosure, a method for Wi-Fi connection is provided. The method includes the following. X parameters of a target access point (AP) are obtained, where the X parameters at least include a target service set identifier (SSID) of the target AP, and X is a positive integer. Wi-Fi scan is performed according to the X parameters. In response to unsuccessful finding of the target AP, M Wi-Fi connection records are determined according to current network environment information from historical Wi-Fi connection data, where each of the M Wi-Fi connection records contains an AP previously connected, and M is a positive integer. Wi-Fi scan is performed according to the target SSID and SSIDs in the M Wi-Fi connection records.

According to an implementation of the disclosure, a terminal is provided. The terminal includes at least one processor and a computer readable storage. The computer readable storage is coupled to the at least one processor and stores at least one computer executable instruction thereon which, when executed by the at least one processor, causes the at least one processor to carry out following actions. X parameters of a target AP is obtained, where the X parameters at least include a target SSID of the target AP, and X is a positive integer. Wi-Fi scan is performed according to the X parameters. According to current network environment information, M Wi-Fi connection records are determined from historical Wi-Fi connection data in response to unsuccessful finding of the target AP, where each of the M Wi-Fi connection records contains an AP previously connected by the terminal, and M is a positive integer. Wi-Fi scan is performed according to the target SSID and SSIDs in the M Wi-Fi connection records.

According to an implementation of the disclosure, a non-transitory computer readable storage medium is provided. The non-transitory computer readable storage medium stores at least one computer program which, when executed by at least one processor, causes the at least one processor to carry out following actions. Wi-Fi scan is performed at least according to a target SSID of a target AP to obtain a scan result. According to the scan result and historical Wi-Fi connection data, information of at least one AP previously connected by a terminal is determined, in response to unsuccessful finding of the target AP, where the information of the at least one AP contains an SSID. Wi-Fi scan is performed according to the target SSID and the SSID of the at least one AP.

Implementations of the present disclosure will be detailed below with reference to the accompanying drawings.

Figure 1:
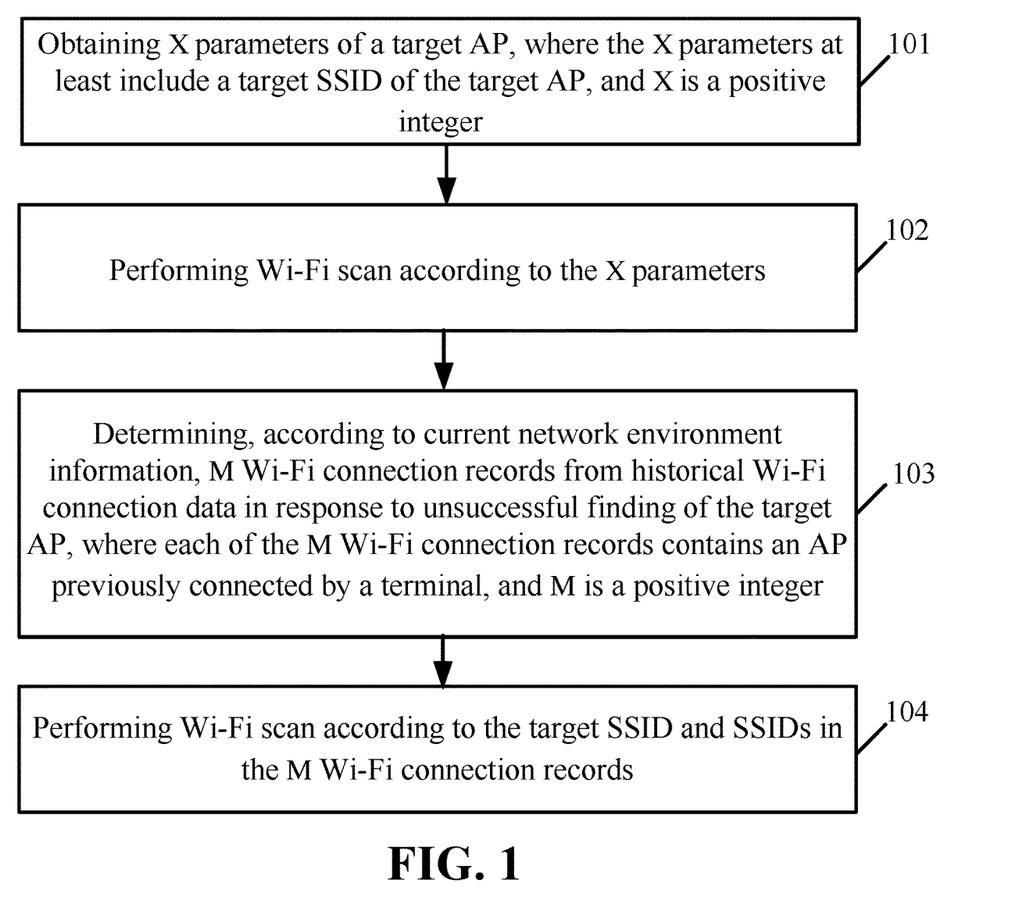
FIG. 1 is a schematic flow chart illustrating a method for Wi-Fi connection according to a first implementation of the present disclosure.

Referring to FIG. 1, FIG. 1 is a schematic flow chart illustrating a method for Wi-Fi connection according to a first implementation of the present disclosure. The method for Wi-Fi connection described in this implementation includes the following.

At block 101, X parameters of a target AP are obtained, where the X parameters at least include a target SSID of the target AP, and X is a positive integer.

The parameters of the target AP include, but are not limited to, an SSID, a BSSID, an encryption mode, and a password. X is an integer larger than or equal to 1. The X parameters can be input by a user or read from a memory of a terminal (for example, multiple SSIDs are stored in the terminal in advance, and one SSID can be read).

At block 102, Wi-Fi scan is performed according to the X parameters.

The terminal performs the Wi-Fi scan according to the X parameters, the target AP may be scanned or may not be scanned. For example, in the case of inputting a wrong SSID, the target AP cannot be identified. In this case, unhidden APs and other APs each having a null SSID (i.e., hidden APs) can still be scanned.

At block 103, in response to unsuccessful finding of the target AP, according to current network environment information, M Wi-Fi connection records are determined from historical Wi-Fi connection data, where each of the M Wi-Fi connection records contains an AP previously connected, and M is a positive integer.

The foregoing current network environment information refers to a network environment where the terminal is currently located. When the terminal cannot find the target AP, the M Wi-Fi connection records can be determined from the historical Wi-Fi connection data according to the current network environment information. Each of the M Wi-Fi connection records contains an AP previously connected by the terminal, and M is a positive integer.

In an implementation, at block 103, according to the current network environment information, the M Wi-Fi connection records are determined from the historical Wi-Fi connection data as follows.

31) Information of N APs each having a null SSID is obtained from a scan result, where N is a positive integer.

32) According to the information of the N APs, the M Wi-Fi connection records are determined from the historical Wi-Fi connection data.

After the terminal performs the Wi-Fi scan, the information of the NAPs each having a null SSID can be obtained from the scan result, where N is a positive integer.

In an implementation, at 32, according to the information of the NAPs, the M Wi-Fi connection records are determined from the historical Wi-Fi connection data as follows.

321) Wi-Fi connection records each containing an AP previously connected are selected from the historical Wi-Fi connection data to obtain A Wi-Fi connection records, where A is an integer equal to or larger than M.

322) Wi-Fi connection records each containing the same BSSID and the same encryption mode for the BSSID as one of the NAPs are determined from the A Wi-Fi connection records to obtain the M Wi-Fi connection records.

The Wi-Fi connection records each containing an AP previously connected by the terminal can be selected from the historical Wi-Fi connection data, and accordingly, the A Wi-Fi connection records can be obtained, where A is an integer not less than M. Further, the Wi-Fi connection records each containing the same BSSID and the same encryption mode for the BSSID as one of the NAPs can be determined from the A Wi-Fi connection records. Taking one of the NAPs as an example, a BSSID of the AP is bssid1 and an encryption mode of the AP is wpa_psk, and thus A Wi-Fi connection records can be traversed according to the bssid1 and the wpa_psk to find Wi-Fi connection records each containing the same BSSID as the bssid1 and the same encryption mode as the wpa_psk.

At block 104, Wi-Fi scan is performed according to the target SSID and SSIDs in the M Wi-Fi connection records.

In an implementation, at block 104, the Wi-Fi scan is performed according to the target SSID and the SSIDs in the M Wi-Fi connection records as follows.

41) The terminal matches the target SSID with each of the SSIDs in the M Wi-Fi connection records to obtain M matching values.

42) A scan priority sequence of the M Wi-Fi connection records is determined according to the M matching values.

43) The Wi-Fi scan is performed according to the scan priority sequence and the M Wi-Fi connection records.

At 41, the terminal can match the target SSID with each of the SSIDs in the M Wi-Fi connection records. In an implementation, the terminal matches each character of the target SSID with each character of each of the SSIDs in the M Wi-Fi connection records, so as to obtain matching values each representing a match between the target SSID and each of the SSIDs in the M Wi-Fi connection records, and thus, the M matching values are obtained. As an example, the number of identical characters of two SSIDs can be determined. For example, the two SSIDs are ssid and ssid1, respectively, if the number of identical characters of the two SSIDs is 4, a matching value can be considered to be 4. In this way, the scan priority sequence of the M Wi-Fi connection records can be further determined according to the M matching values. For instance, the scan priority sequence of the M Wi-Fi connection records is determined in descending order of the matching values. As such, the Wi-Fi scan can be performed according to the scan priority sequence and the M Wi-Fi connection records. For example, the M Wi-Fi connection records include a Wi-Fi connection record A, a Wi-Fi connection record B, a Wi-Fi connection record C, and a Wi-Fi connection record D. The scan priority sequence is the Wi-Fi connection record B→, the Wi-Fi connection record C→the Wi-Fi connection A→the Wi-Fi connection record D. The Wi-Fi scan can be first performed according to the Wi-Fi connection record B. For example, the Wi-Fi scan can be performed according to information of an AP previously connected by the terminal that is recorded in the Wi-Fi connection record B.

In an implementation, at block 104, the Wi-Fi scan is performed according to the target SSID and the SSIDs in the M Wi-Fi connection records as follows.

45) The terminal matches the target SSID with each of the SSIDs in the M Wi-Fi connection records to obtain a target Wi-Fi connection record.

46) The Wi-Fi scan is performed according to the target Wi-Fi connection record.

At 45, when matching the target SSID with each of the SSIDs in the M Wi-Fi connection records, if a difference between the target SSID and one of the SSIDs in the M Wi-Fi connection records is within a preset range, it is determined that the SSID matches with the target SSID. The preset range herein may be that the difference is no more than one character. As an example, assuming that the target SSID is cathay007 and an SSID in a Wi-Fi connection record is cathau007, it is determined that the target SSID matches with the SSID in the Wi-Fi connection record. However, in practice, there may be a case where information input by a user is wrong. Therefore, implementations of the present disclosure provides a fault tolerance mechanism, which can improve the efficiency of connecting to a hidden AP. As another example, during matching the target SSID with each of M SSIDs in the M Wi-Fi connection records, when a first SSID the same as the target SSID exists, the Wi-Fi scan is performed according to a Wi-Fi connection record corresponding to the first SSID, or the Wi-Fi scan is performed according to an encryption mode of an AP previously connected by the terminal and the target SSID, where the encryption mode is extracted from the Wi-Fi connection record corresponding to the first SSID.

The implementations of the present disclosure are applicable to the following scenarios. Generally, before connecting to a hidden AP, a completely correct SSID is specified to scan and find the AP. If the SSID specified is wrong, a specified AP is unable to be scanned, and thus the terminal cannot be connected to the specified AP. For example, if an SSID specified is abcd1, and an SSID for Wi-Fi scan is abcd, the specified AP cannot be scanned and accordingly, the terminal cannot be connected to the specified AP. In the implementations of the present disclosure, according to BSSIDs of all currently scanned APs each having a null SSID, all Wi-Fi connection records each containing an AP previously connected and each containing the same BSSID and the same encryption mode as one of the APs each having a null SSID may be determined from the historical Wi-Fi connection data. Information of APs in the Wi-Fi connection records is saved to a list L. Then, matching values each representing a match between the SSID input and each of SSIDs of the APs in the list L are arranged in sequence, and thus the SSIDs of the APs in the list L are sequentially specified for Wi-Fi scan in descending order of the matching values. If the specified AP is scanned, the terminal is connected to the specified AP. Otherwise, Wi-Fi scan is further performed according to the matching values until all the APs in the list L are scanned. In this way, a probability of connecting to a hidden AP is improved.

According to the implementations of the present disclosure, the X parameters of the target AP can be obtained, where the X parameters at least include the target SSID of the target AP, and X is a positive integer. Wi-Fi scan is performed according to the X parameters. In response to unsuccessful finding of the target AP, the M Wi-Fi connection records are determined from the historical Wi-Fi connection data according to the current network environment information, where each of the M Wi-Fi connection records contains an AP previously connected by the terminal, and M is a positive integer. Wi-Fi scan is performed according to the target SSID and the SSIDs in the M Wi-Fi connection records. Although the target AP cannot be identified in the case of inputting a wrong SSID, the M Wi-Fi connection records each containing the AP previously connected by the terminal can be determined from the historical Wi-Fi connection data, and Wi-Fi scan is performed according to the target SSID and the SSIDs in the M Wi-Fi connection records, which can improve the probability of finding the target AP, and therefore the efficiency of connecting to the hidden AP can be improved.

Figure 2:
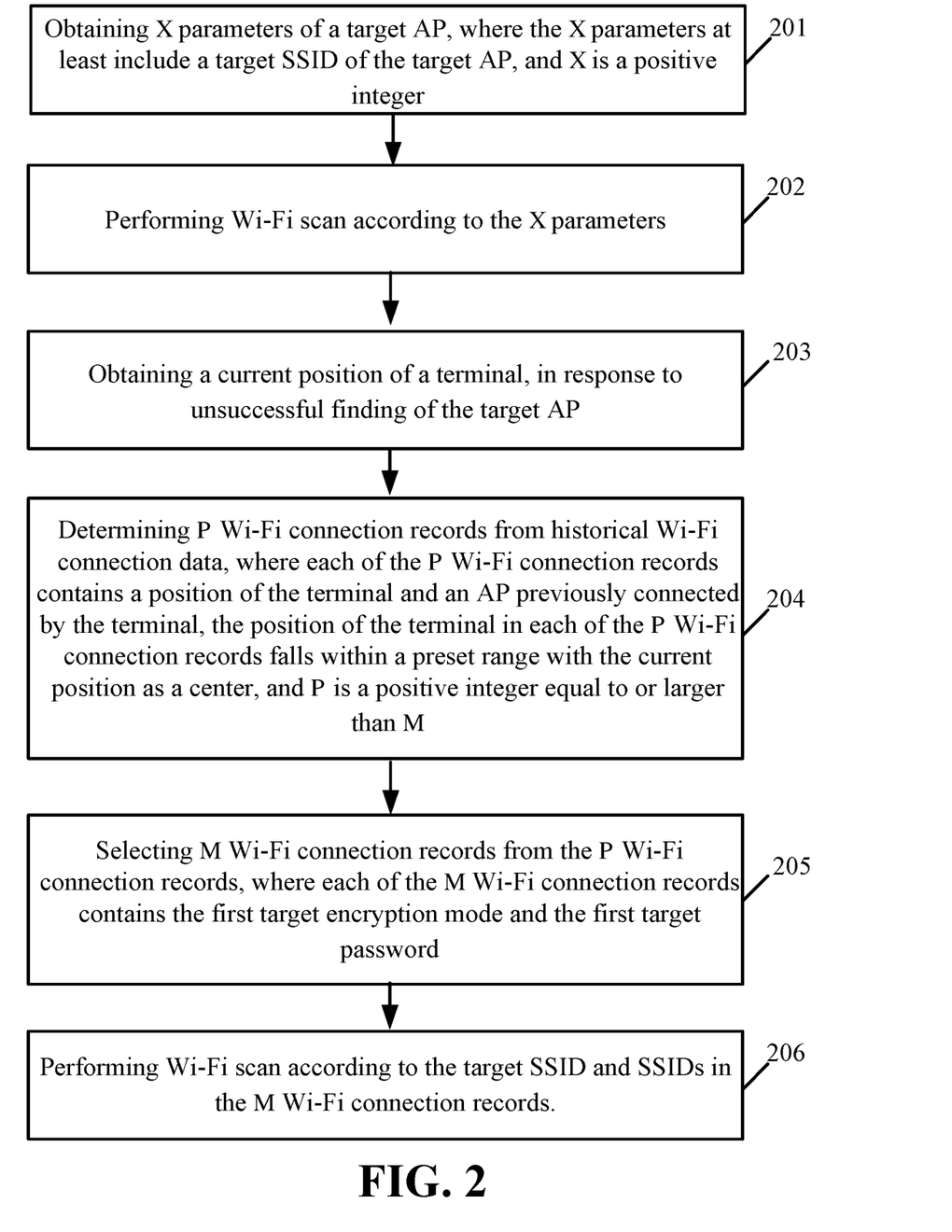
FIG. 2 is a schematic flow chart illustrating a method for Wi-Fi connection according to a second implementation of the present disclosure.

Similar to the above implementations, referring to FIG. 2, FIG. 2 is a schematic flow chart illustrating a method for Wi-Fi connection according to a second implementation of the present disclosure. The method for Wi-Fi connection described in this implementation includes the following.

At block 201, X parameters of a target AP are obtained, where the X parameters include a target SSID of the target AP, a first target encryption mode, and a first target password.

At block 202, Wi-Fi scan is performed according to the X parameters.

At block 203, in response to unsuccessful finding of the target AP, a current position of a terminal is obtained.

The terminal can determine the current position of the terminal through a global positioning system (GPS) or a Wi-Fi positioning technology. The current position of the terminal can be represented by latitude and longitude. For example, the current position can be expressed as 113°46' east longitude and 22°27' north latitude. Certainly, if the current position of the terminal is determined by means of the Wi-Fi positioning technology, a position of an AP scanned through a current Wi-Fi scan is taken as the position of the terminal, and the position of the AP is marked as a point in an indoor map (i.e., a point indicating the position of the terminal).

At block 204, P Wi-Fi connection records are determined from historical Wi-Fi connection data, where each of the P Wi-Fi connection records contains a position of the terminal and an AP previously connected by the terminal, the position of the terminal in each of the P Wi-Fi connection records falls within a preset range with the current position as a center, and P is a positive integer equal to or larger than M.

Each Wi-Fi connection record in the historical Wi-Fi connection data may contain a position (i.e., position information). As such, the P Wi-Fi connection records can be determined from the historical Wi-Fi connection data, where each of the P Wi-Fi connection records contains the position of the terminal and an AP previously connected by the terminal, the position of the terminal in each of the P Wi-Fi connection records falls within the preset range with the current position as a center, M is a positive integer, and P is a positive integer not less than M.

At block 205, M Wi-Fi connection records are selected from the P Wi-Fi connection records, where each of the M Wi-Fi connection records contains the first target encryption mode and the first target password.

The terminal can traverse the P Wi-Fi connection records according to the first target encryption mode and the first target password to obtain the M Wi-Fi connection records.

At block 206, Wi-Fi scan is performed according to the target SSID and SSIDs in the M Wi-Fi connection records.

For details of the operations at block 201, 202, and 206, reference can be made to corresponding operations of the method for Wi-Fi connection described in conjunction with in FIG. 1, and details are not repeated herein.

For example, each time the terminal is connected to an AP, information such as an SSID, a BSSID, an encryption mode, and a password of the AP, and a position of the terminal is recorded to form a Wi-Fi connection record of the AP, and the Wi-Fi connection of the AP is saved to a file of the terminal. The file can be set so that information in the file cannot be deleted, and are used to record information of all APs previously connected. Accordingly, the historical Wi-Fi connection data is obtained. The terminal can determine the position of the terminal, and from the historical Wi-Fi connection data, all Wi-Fi connection records are obtained, where each of the all Wi-Fi connection records contains an AP previously connected by the terminal and the position of the terminal falling within a preset range (e.g., 10 meters), and contains the same encryption mode as an encryption mode input and the same password the password input. Information of APs in the Wi-Fi connection records is saved to a list L. Then, the terminal matches an SSID input with each of SSIDs of the APs in the list L to obtain multiple matching values. A scan priority sequence can be determined in descending order of the matching values. SSIDs of the APs in the list L are sequentially specified for Wi-Fi scan according to the scan priority sequence. If the specified AP is scanned, the terminal is connected to the specified AP. Otherwise, Wi-Fi scan is further performed according to the scan priority sequence until all the APs in the list L are scanned.

As such, in response to unsuccessful finding of the target AP due to inputting a wrong SSID, according to the current position of the terminal, the M Wi-Fi connection records each containing the AP previously connected by the terminal can be determined from the historical Wi-Fi connection data. Wi-Fi scan is performed according to the target SSID and the SSIDs in the M Wi-Fi connection records, which can improve a probability of finding the target AP, and thus the efficiency of connecting to the hidden AP can be improved.

Figure 3:
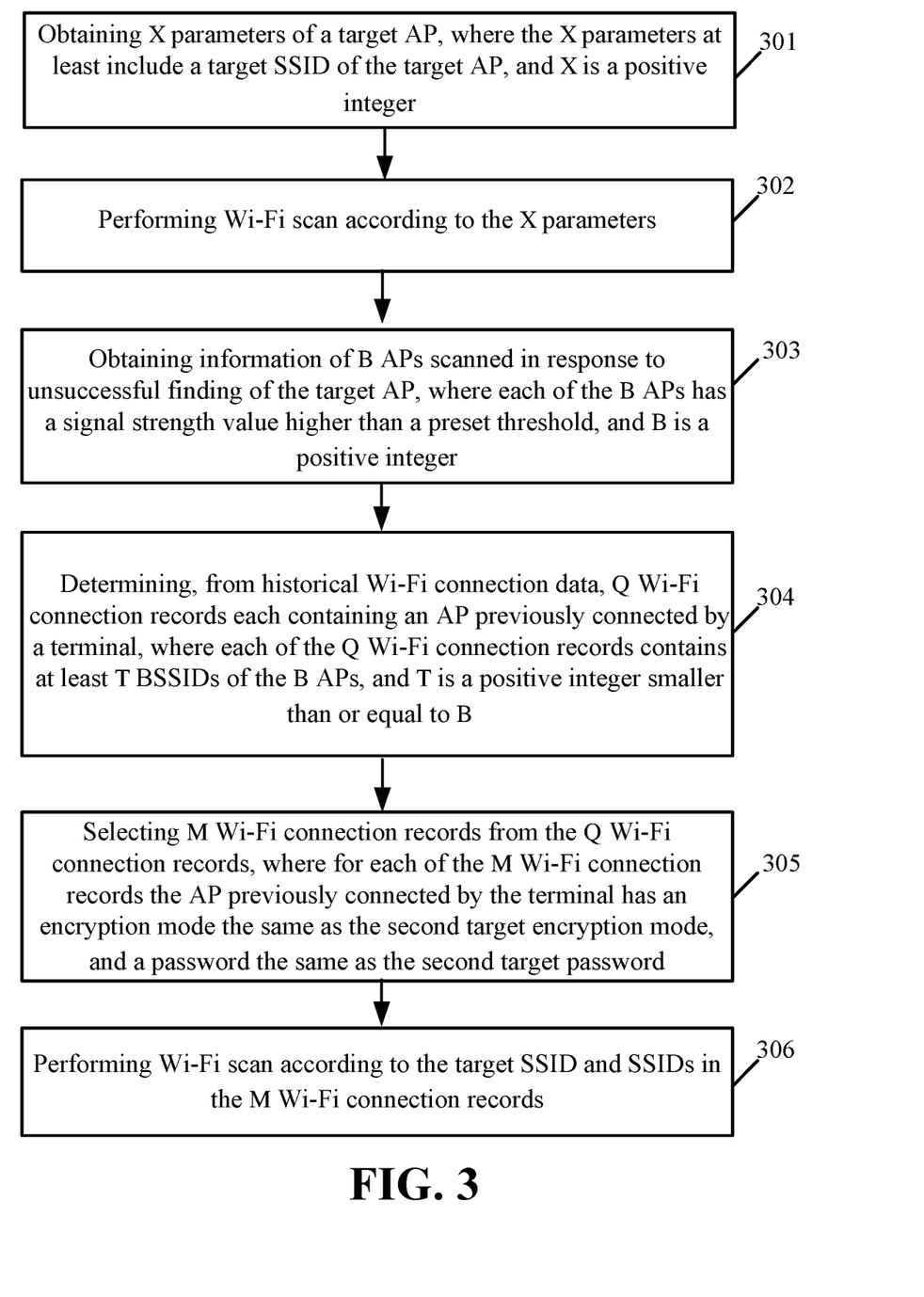
FIG. 3 is a schematic flow chart illustrating a method for Wi-Fi connection according to a third implementation of the present disclosure.

Similar to the above implementations, referring to FIG. 3, FIG. 3 is a schematic flow chart illustrating a method for Wi-Fi connection according to a third implementation of the present disclosure. The method for Wi-Fi connection described in this implementation includes the following.

At block 301, X parameters of a target AP are obtained, where the X parameters include a target SSID of the target AP, a second target encryption mode, and a second target password, and X is a positive integer.

At block 302, Wi-Fi scan is performed according to the X parameters.

At block 303, in response to unsuccessful finding of the target AP, information of B APs scanned is obtained, where each of the B APs has a signal strength value higher than a preset threshold, and B is a positive integer.

In response to unsuccessful finding of the target AP, information of other APs can still be obtained. As such, the information of the B scanned APs can be selected from a scan result, where each of the B APs has a signal strength value higher than a preset threshold, and B is a positive integer.

At block 304, Q Wi-Fi connection records each containing an AP previously connected by the terminal are determined from historical Wi-Fi connection data, where each of the Q Wi-Fi connection records contains at least T BSSIDs of the B APs, and T is a positive integer smaller than or equal to B.

T herein may be set by a user or by default. The B APs may contain B BSSIDs. The terminal can determine, from the historical Wi-Fi connection data, the Q Wi-Fi connection records each containing an AP previously connected by the terminal. Each of the Q Wi-Fi connection records contains the at least T BSSIDs of the B APs (i.e., at least T BSSIDs of the B BSSIDs), and T is a positive integer less than or equal to B.

At block 305, M Wi-Fi connection records are selected from the Q Wi-Fi connection records, where for each of the M Wi-Fi connection records the AP previously connected by the terminal has an encryption mode the same as the second target encryption mode, and a password the same as the second target password.

The M Wi-Fi connection records can be selected from the Q Wi-Fi connection records. For each of the M Wi-Fi connection records, the AP previously connected by the terminal has the encryption mode the same as the second target encryption mode, and the password the same as the second target password.

At block 306, Wi-Fi scan is performed according to the target SSID and SSIDs in the M Wi-Fi connection records.

For details of the operations at block 301, 302, and 306, reference can be made to corresponding operations of the method for Wi-Fi connection described in conjunction with in FIG. 1, and details are not repeated herein.

For example, each time the terminal is connected to an AP, information such as a BSSID, an encryption mode, and a password of the AP, and at most M (e.g., M=5) surrounding APs having signal strength higher than R (e.g., R=−80 db) is recorded. Information of these surrounding APs (i.e., the information of the surrounding APs satisfying a certain condition may be referred to as neighbor information of the AP) is contained in a Wi-Fi connection record of the AP. Multiple Wi-Fi connection records can constitute the historical Wi-Fi connection data, and the historical Wi-Fi connection data is saved to a local file. The terminal can obtain, according to information of currently scanned APs, at most M scanned APs each having a signal strength value higher than R. The terminal matches information of the M scanned APs with neighbor information of an AP recorded in each history record. If there are at least N surrounding APs in neighbor information of any of APs of history records each having the same BSSID as one of the M scanned APs (N<M, such as N=3), it is determined that an initial matching is successful. In response to the successful initial matching of the historical Wi-Fi connection records, from the historical Wi-Fi connection records, information of the APs each containing an encryption mode the same as the second target encryption mode and a password the same as the second target password is saved to a list L. Then, the terminal matches an SSID input with each of SSIDs of the APs in the list L to obtain multiple matching values. A scan priority sequence can be determined in descending order of the matching values. SSIDs of the APs in the list L are sequentially specified for Wi-Fi scan according to the scan priority sequence. If the specified AP is scanned, the terminal is connected to the specified AP. Otherwise, Wi-Fi scan is further performed in accordance with the order of the matching values until all the APs in the list L are scanned.

As such, in response to unsuccessful finding of the target AP due to inputting a wrong SSID, according to information of APs surrounding the terminal, the M Wi-Fi connection records each containing the AP previously connected by the terminal can be determined from the historical Wi-Fi connection data, where each of the APs has a signal strength value higher than a certain threshold value. Wi-Fi scan is performed according to the target SSID and the SSIDs in the M Wi-Fi connection records, which can improve a probability of finding the target AP, and thus the efficiency of connecting to the hidden AP can be improved.

Similar to the above implementations, a device for implementing the above method for Wi-Fi connection is provided, as described in detail below.

Figure 4:
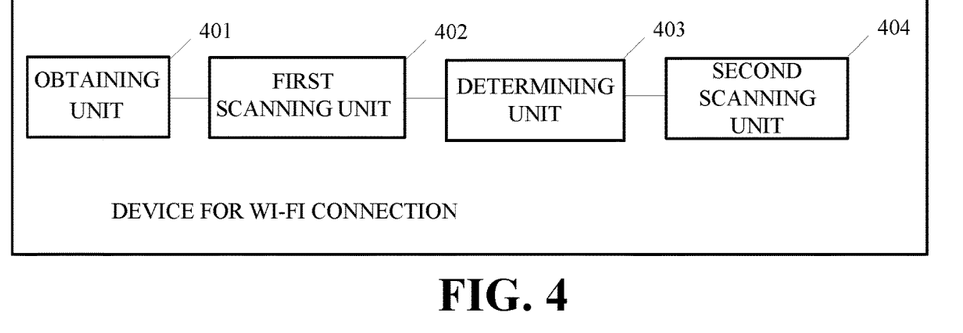
FIG. 4 is a schematic structural diagram illustrating a device for Wi-Fi connection according to an implementation of the present disclosure.

Referring to FIG. 4, FIG. 4 is a schematic structural diagram illustrating a device for Wi-Fi connection according to an implementation of the present disclosure. The device for Wi-Fi connection includes an obtaining unit 401, a first scanning unit 402, a determining unit 403, and a second scanning unit 404.

The obtaining unit 401 is configured to obtain X parameters of a target AP, where the X parameters at least include a target SSID of the target AP, and X is a positive integer.

The first scanning unit 402 is configured to perform Wi-Fi scan according to the X parameters.

The determining unit 403 is configured to determine M Wi-Fi connection records from historical Wi-Fi connection data according to current network environment information, in response to unsuccessful finding of the target AP, where each of the M Wi-Fi connection records contains an AP previously connected by a terminal, and M is a positive integer.

The second scanning unit 404 is configured to perform Wi-Fi scan according to the target SSID and SSIDs in the M Wi-Fi connection records.

Figure 5:
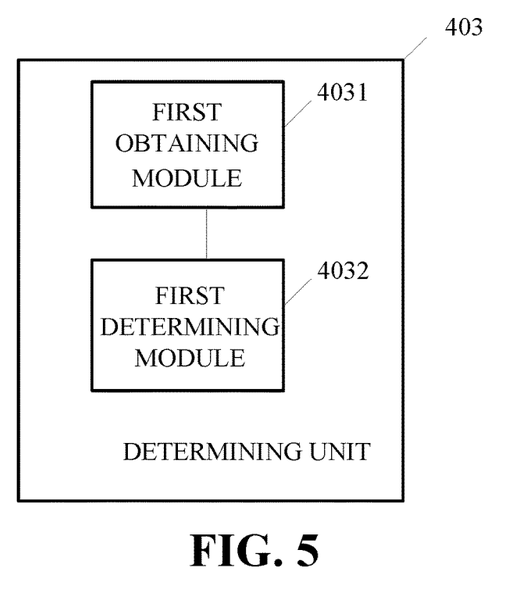
FIG. 5 is a schematic structural diagram illustrating a determining unit of the device for Wi-Fi connection illustrated in FIG. 4 according to an implementation of the present disclosure.

FIG. 5 illustrates a detailed structure of the determining unit 403 of the device for Wi-Fi connection illustrated in FIG. 4. As illustrated in FIG. 5, the determining unit 403 includes a first obtaining module 4031 and a first determining module 4032.

The first obtaining module 4031 is configured to obtain, from a scan result, information of N APs each having a null SSID, where N is a positive integer.

The first determining module 4032 is configured to determine, according to the information of the N APs, the M Wi-Fi connection records from the historical Wi-Fi connection data.

Figure 6:
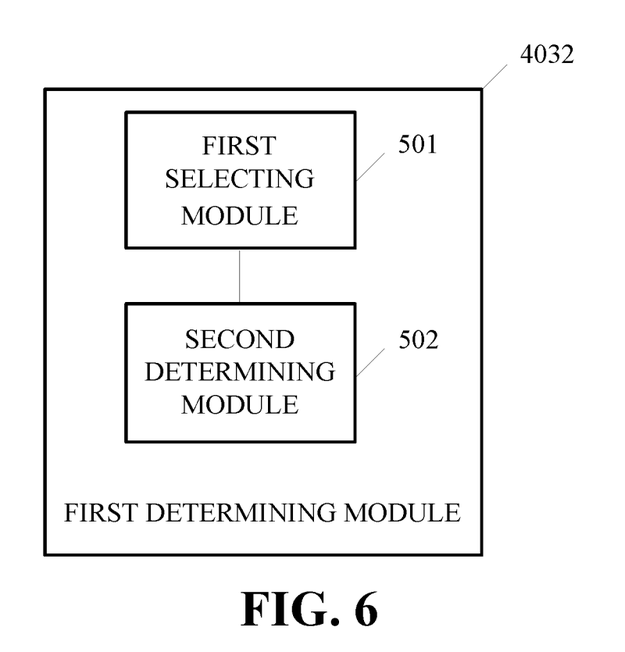
FIG. 6 is another schematic structural diagram illustrating a first determining module of the determining unit illustrated in FIG. 5 according to an implementation of the present disclosure.

FIG. 6 illustrates a detailed structure of the first determining module 4032 of the determining unit 403 illustrated in FIG. 5. As illustrated in FIG. 6, the first determining module 4032 includes a first selecting module 501 and a second determining module 502.

The first selecting module 501 is configured to select, from the historical Wi-Fi connection data, Wi-Fi connection records each containing an AP previously connected by the terminal to obtain A Wi-Fi connection records, where A is an integer equal to or larger than M.

The second determining module 502 is configured to determine, from the A Wi-Fi connection records, Wi-Fi connection records each containing the same BSSID and the same encryption mode for the BSSID as one of the NAPs to obtain the M Wi-Fi connection records.

Figure 7:
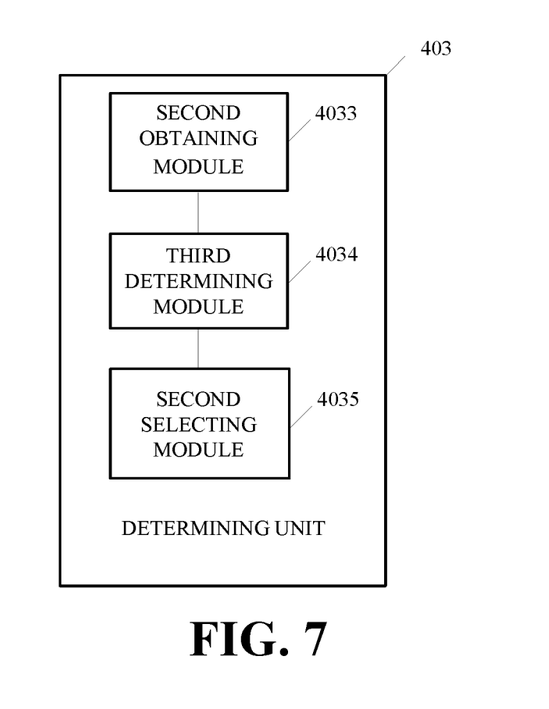
FIG. 7 is another schematic structural diagram illustrating the determining unit of the device for Wi-Fi connection illustrated in FIG. 4 according to an implementation of the present disclosure.

In an implementation, the X parameters further include a first target encryption mode and a first target password. FIG. 7 illustrates a detailed structure of the determining unit 403 of the device for Wi-Fi connection illustrated in FIG. 4. As illustrated in FIG. FIG. 7, the determining unit 403 includes a second obtaining module 4033, a third determining module 4034, and a second selecting module 4035.

The second obtaining module 4033 is configured to obtain a current position of the terminal.

The third determining module 4034 is configured to determine P Wi-Fi connection records from the historical Wi-Fi connection data, where each of the P Wi-Fi connection records contains a position of the terminal and an AP previously connected by the terminal, the position of the terminal in each of the P Wi-Fi connection records falls within a preset range with the current position as a center, and P is a positive integer equal to or larger than M.

The second selecting module 4035 is configured to select the M Wi-Fi connection records from the P Wi-Fi connection records, where each of the M Wi-Fi connection records contains the first target encryption mode and the first target password.

In an implementation, the second obtaining module 4033 is configured to obtain the current position through a global positioning system or a Wi-Fi positioning technology.

Figure 8:
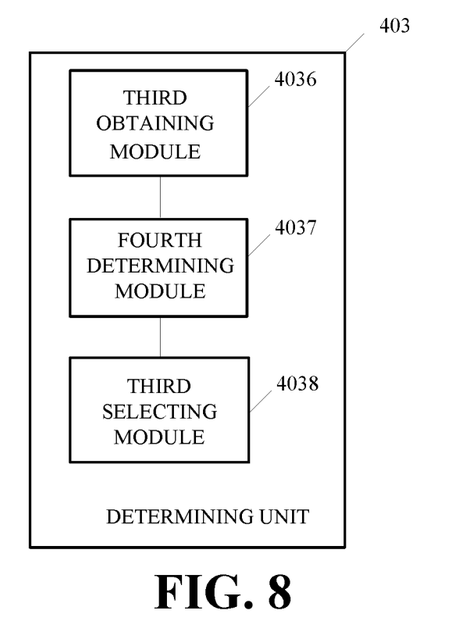
FIG. 8 is yet another schematic structural diagram illustrating the determining unit of the device for Wi-Fi connection illustrated in FIG. 4 according to an implementation of the present disclosure.

In an implementation, the X parameters further include a second target encryption mode and a second target password. FIG. 8 illustrates a detailed structure of the determining unit 403 of the device for Wi-Fi connection illustrated in FIG. 4. As illustrated in FIG. FIG. 8, the determining unit 403 includes a third obtaining module 4036, a fourth determining module 4037, and a third selecting module 4038.

The third obtaining module 4036 is configured to obtain information of B APs scanned, where each of the B APs has a signal strength value higher than a preset threshold, and B is a positive integer.

The fourth determining module 4037 is configured to determine, from the historical Wi-Fi connection data, Q Wi-Fi connection records each containing an AP previously connected by the terminal, where each of the Q Wi-Fi connection records contains at least T BSSIDs of the B APs, and T is a positive integer smaller than or equal to B.

The third selecting module 4038 is configured to select the M Wi-Fi connection records from the Q Wi-Fi connection records, where for each of the M Wi-Fi connection records the AP previously connected by the terminal has an encryption mode the same as the second target encryption mode, and a password the same as the second target password.

Figure 9:
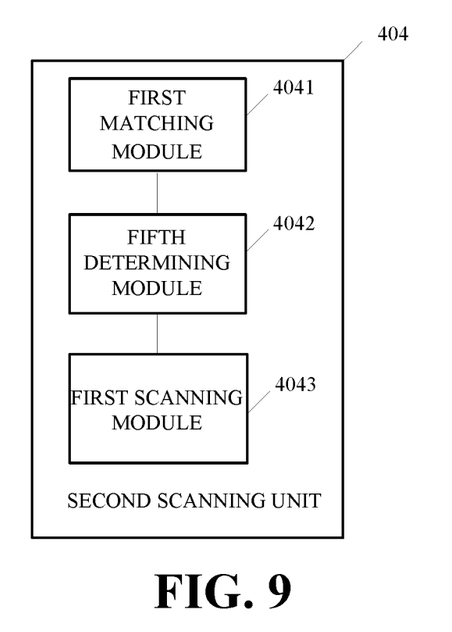
FIG. 9 is a schematic structural diagram illustrating a second scanning unit of the device for Wi-Fi connection illustrated in FIG. 4 according to an implementation of the present disclosure.

FIG. 9 illustrates a detailed structure of the second scanning unit 404 of the device for Wi-Fi connection illustrated in FIG. 4. As illustrated in FIG. 9, the second scanning unit 404 includes a first matching module 4041, a fifth determining module 4042, and a first scanning module 4043.

The first matching module 4041 is configured to match the target SSID with each of the SSIDs in the M Wi-Fi connection records to obtain M matching values.

The fifth determining module 4042 is configured to determine a scan priority sequence of the M Wi-Fi connection records according to the M matching values.

The first scanning module 4043 is configured to perform the Wi-Fi scan according to the scan priority sequence and the M Wi-Fi connection records.

In an implementation, the first matching module 4041 configured to match the target SSID with each of the SSIDs in the M Wi-Fi connection records is configured to: match each character of the target SSID with each character of each of the SSIDs in the M Wi-Fi connection records.

Figure 10:
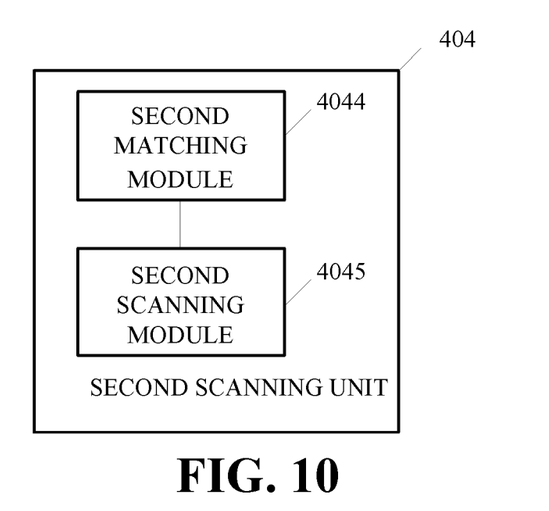
FIG. 10 is another schematic structural diagram illustrating the second scanning unit of the device for Wi-Fi connection illustrated in FIG. 4 according to an implementation of the present disclosure.

FIG. 10 illustrates a detailed structure of the second scanning unit 404 of the device for Wi-Fi connection illustrated in FIG. 4. As illustrated in FIG. 10, the second scanning unit 404 includes a second matching module 4044 and a second scanning module 4045.

The second matching module 4044 is configured to match the target SSID with each of the SSIDs in the M Wi-Fi connection records to obtain a target Wi-Fi connection record.

The second scanning module 4045 is configured to perform the Wi-Fi scan according to the target Wi-Fi connection record.

It can be seen that, according to the device for Wi-Fi connection described in the implementations of the present disclosure, the X parameters of the target AP are obtained, and the X parameters at least include the target SSID of the target AP, and X is positive integer. Wi-Fi scan is performed according to the X parameters. In response to unsuccessful finding of the target AP, according to the current network environment information, the M Wi-Fi connection records are determined from the historical Wi-Fi connection data, where each of the M Wi-Fi connection records contains an AP previously connected, and M is a positive integer. Wi-Fi scan is performed according to the target SSID and the SSIDs in the M Wi-Fi connection records. Although the target AP cannot be identified in the case of inputting a wrong SSID, the M Wi-Fi connection records each containing the AP previously connected can be determined from the historical Wi-Fi connection data, and Wi-Fi scan is performed according to the target SSID and the SSIDs in the M Wi-Fi connection records, which can improve the probability of finding the target AP, and therefore the efficiency of connecting to the hidden AP can be improved.

It is to be noted that, the device for Wi-Fi connection described in the device implementation of the disclosure is presented in the form of functional units. The terms "unit" and "module" used herein should be understood as the broadest meaning as possible, and an object for implementing functions defined by each "unit" or "module" may be, for example, an application specific integrated circuit (ASIC), a single circuit, a processor (shared, dedicated, or chipset) and a memory for executing one or more software or firmware programs, a combinational logic circuit, and/or other suitable components that can achieve the above described functions.

Figure 11:
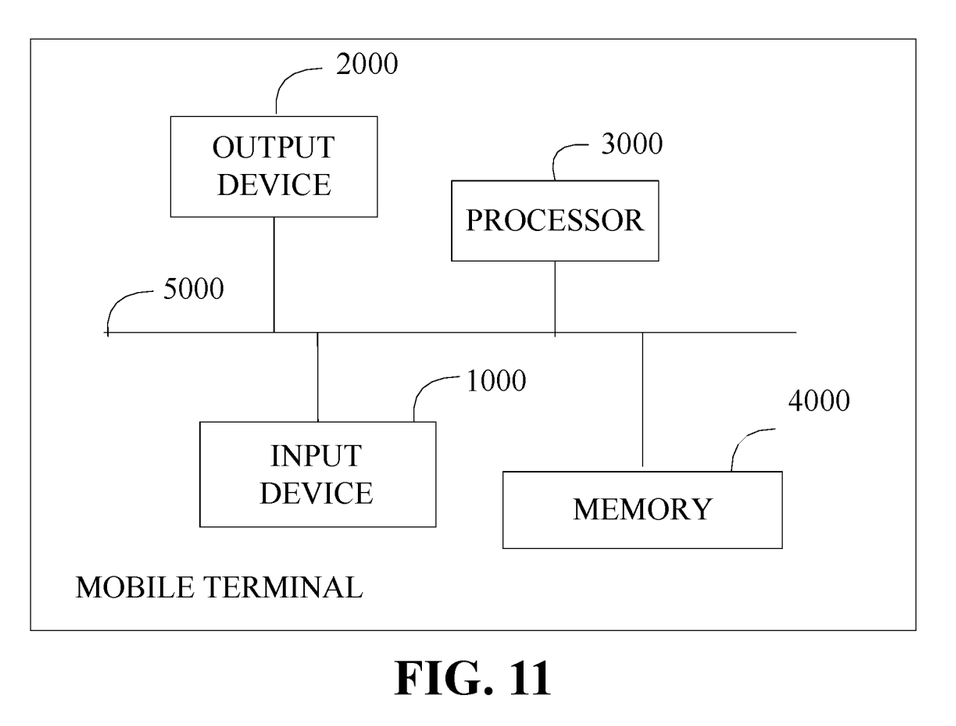
FIG. 11 is a schematic structural diagram illustrating a terminal according to an implementation of the present disclosure.

For example, the obtaining unit 401 configured to obtain the X parameters of the target AP may be implemented by a terminal illustrated in FIG. 11. A processor 3000 may obtain the X parameters of the target AP by invoking executable program codes stored in a memory 4000.

Similar to the above implementations, referring to FIG. 11, FIG. 11 is a schematic structural diagram illustrating a terminal according to an implementation of the present disclosure. The terminal described in the implementation includes at least one input device 1000, at least one output device 2000, at least one processor 3000 such as a central processing unit (CPU), and a memory 4000. The input device 1000, the output device 2000, the processor 3000, and the memory 4000 are coupled with each other through a bus 5000.

The input device 1000 may be a touch screen, a physical key, or a mouse.

The output device 2000 may be a display screen.

The memory 4000 may be a random access memory (RAM), and may be a non-volatile memory, such as a disk storage. The memory 4000 is configured to store a set of program codes. The input device 1000, the output device 2000, and the processor 3000 are configured to invoke the program codes stored in the memory 4000 to execute the following.

The processor 3000 is configured to: obtain X parameters of a target AP, the X parameters at least include a target SSID of the target AP, where X is a positive integer; perform Wi-Fi scan according to the X parameters; determine, according to current network environment information, M Wi-Fi connection records from historical Wi-Fi connection data in response to unsuccessful finding of the target AP, where each of the M Wi-Fi connection records contains an AP previously connected by a terminal, and M is a positive integer; and perform Wi-Fi scan according to the target SSID and SSIDs in the M Wi-Fi connection records.

In an implementation, the processor 3000 configured to determine, according to the current network environment information, the M Wi-Fi connection records from the historical Wi-Fi connection data is configured to: obtain, from a scan result, information of N APs each having a null SSID, where N is a positive integer; and determine, according to the information of the N APs, the M Wi-Fi connection records from the historical Wi-Fi connection data.

In an implementation, the processor 3000 configured to determine, according to the information of the N APs, the M Wi-Fi connection records from the historical Wi-Fi connection data is configured to: select, from the historical Wi-Fi connection data, Wi-Fi connection records each containing an AP previously connected by the terminal to obtain A Wi-Fi connection records, where A is an integer equal to or larger than M; and determine, from the A Wi-Fi connection records, Wi-Fi connection records each containing the same BSSID and the same encryption mode for the BSSID as one of the NAPs to obtain the M Wi-Fi connection records.

In an implementation, the X parameters further include a first target encryption mode and a first target password. The processor 3000 configured to determine, according to the current network environment information, the M Wi-Fi connection records from the historical Wi-Fi connection data is configured to: obtain a current position of the terminal; determine P Wi-Fi connection records from the historical Wi-Fi connection data, where each of the P Wi-Fi connection records contains a position of the terminal and an AP previously connected by the terminal, where the position of the terminal in each of the P Wi-Fi connection records falls within a preset range with the current position as a center, and P is a positive integer equal to or larger than M; and select the M Wi-Fi connection records from the P Wi-Fi connection records, where each of the M Wi-Fi connection records contains the first target encryption mode and the first target password.

In an implementation, the processor 3000 is configured to obtain the current position through a global positioning system or a Wi-Fi positioning technology.

In an implementation, the X parameters further include a second target encryption mode and a second target password. The processor 3000 configured to determine, according to the current network environment information, the M Wi-Fi connection records from the historical Wi-Fi connection data is configured to: obtain information of B APs scanned, where each of the B APs has a signal strength value higher than a preset threshold, and B is a positive integer; determine, from the historical Wi-Fi connection data, Q Wi-Fi connection records each containing an AP previously connected by the terminal, where each of the Q Wi-Fi connection records contains at least T BSSIDs of the B APs, and T is a positive integer smaller than or equal to B; and select the M Wi-Fi connection records from the Q Wi-Fi connection records, where for each of the M Wi-Fi connection records the AP previously connected by the terminal has an encryption mode the same as the second target encryption mode, and a password the same as the second target password.

In an implementation, the processor 3000 configured to perform the Wi-Fi scan according to the target SSID and the SSIDs in the M Wi-Fi connection records is configured to: match the target SSID with each of the SSIDs in the M Wi-Fi connection records to obtain M matching values; determine a scan priority sequence of the M Wi-Fi connection records according to the M matching values; and perform the Wi-Fi scan according to the scan priority sequence and the M Wi-Fi connection records.

In an implementation, the processor 3000 configured to match the target SSID with each of the SSIDs in the M Wi-Fi connection records is configured to: match each character of the target SSID with each character of each of the SSIDs in the M Wi-Fi connection records.

In an implementation, the processor 3000 configured to perform the Wi-Fi scan according to the target SSID and the SSIDs in the M Wi-Fi connection records is configured to: match the target SSID with each of the SSIDs in the M Wi-Fi connection records to obtain a target Wi-Fi connection record; and perform the Wi-Fi scan according to the target Wi-Fi connection record.

The implementations of the present disclosure also provide a non-transitory computer storage medium. The non-transitory computer readable storage medium is configured to store at least one computer program which, when executed by at least one processor, causes the at least one processor to carry out following actions. Wi-Fi scan is performed at least according to a target SSID of a target AP to obtain a scan result. According to the scan result and historical Wi-Fi connection data, information of at least one AP previously connected by a terminal is determined, in response to unsuccessful finding of the target AP, where the information of the at least one AP contains an SSID. Wi-Fi scan is performed according to the target SSID and the SSID of the at least one AP.

In an implementation, the at least one AP is embodied as multiple APs. The computer program executed by the processor to carry out the action of performing the Wi-Fi scan according to the target SSID and the SSID of the at least one AP is executed by the processor to carry out following actions. Match the target SSID with the SSID of each of the multiple APs to obtain multiple matching values. A scan priority sequence of the SSIDs of the multiple APs is determined according to the matching values. The Wi-Fi scan is performed according to the SSIDs of the multiple APs and the scan priority sequence.

It should be understood that the implementation process will not be detailed herein and reference may be made to the foregoing method implementations.

The implementations of the present disclosure also provide a computer program product. The computer program product includes a non-transitory computer readable storage medium that stores computer programs, where the computer programs are operable with a computer to execute some of or all operations of the method for Wi-Fi connection described in any one of method implementations of the present disclosure.

Although the present disclosure has been described in conjunction with various implementations herein, however, other variations to the enclosed implementations can be understood and effected by those skilled in the art from a study of the drawings, the present disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

Those skilled in the art should understand that the implementation of the present disclosure may be provided as a method, an apparatus (equipment), or a computer program product. Therefore, the present disclosure may use a form of hardware only implementations, software only implementations, or implementations with a combination of software and hardware. Moreover, the present disclosure may use a form of a computer program product that is implemented on one or more computer-usable storage media (including but not limited to a disk memory, a CD-ROM, an optical memory, and the like) that include computer-usable program codes. The computer program is stored/distributed in a proper medium and is provided as or used as a part of the hardware together with another hardware, or may also use another allocation form, such as by using the Internet or another wired or wireless telecommunications system.

The present disclosure is described in connection with flowcharts and/or block diagrams of the method, apparatus (equipment), and computer program product according to the implementations of the present disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor, or a processor of other programmable data processing equipment to generate a machine, so that an apparatus for realizing a function specified in one flow or more flows in the flowcharts and/or one block or more blocks in the block diagrams is generated by the instructions executed through the computer or the processor of the other programmable data processing device.

These computer program instructions may also be stored in a computer readable memory capable of guiding the computer or the other programmable data processing device to work in a specific manner, so that a product including an instruction device may be generated by the instructions stored in the computer readable memory, the instruction device realizing the function specified in one flow or many flows in the flowcharts and/or one block or many blocks in the block diagrams.

These computer program instructions may further be loaded onto the computer or the other programmable data processing device, so that a series of operations are executed on the computer or the other programmable data processing device to generate processing implemented by the computer, and operations for realizing the function specified in one flow or many flows in the flowcharts and/or one block or many blocks in the block diagrams are provided by the instructions executed on the computer or the other programmable data processing device.

Although the present disclosure is described in connection with specific characteristics and the implementations, obviously, various modifications and combinations may be made to the present disclosure without departing from the spirit and scope of the present disclosure. Correspondingly, the specification and the drawings are only exemplary descriptions about the present disclosure defined by the appended claims, and are considered to cover any and all modifications, variations, combinations or equivalents in the scope of the present disclosure. Obviously, those skilled in the art may make various modifications and variations to the present disclosure without departing from the spirit and scope of the present disclosure. Therefore, if these modifications and variations of the present disclosure belong to the scope of the claims of the present disclosure and equivalent technologies thereof, the present disclosure is also intended to include these modifications and variations.

What is claimed is:

1. A method for wireless fidelity (Wi-Fi) connection, comprising:

obtaining X parameters of a target access point (AP), the X parameters at least comprising a target service set identifier (SSID) of the target AP, and X being a positive integer;

performing Wi-Fi scan according to the X parameters;

determining, according to current network environment information, M Wi-Fi connection records from historical Wi-Fi connection data in response to unsuccessful finding of the target AP, each of the M Wi-Fi connection records containing an AP previously connected by a terminal, and M being a positive integer; and performing Wi-Fi scan according to the target SSID and SSIDs in the M Wi-Fi connection records;

wherein performing the Wi-Fi scan according to the target SSID and the SSIDs in the M Wi-Fi connection records comprises:

matching the target SSID with each of the SSIDs in the M Wi-Fi connection records to obtain M matching values;

determining a scan priority sequence of the M Wi-Fi connection records according to the M matching values; and performing the Wi-Fi scan according to the scan priority sequence and the M Wi-Fi connection records.

2. The method of claim 1, wherein determining, according to the current network environment information, the M Wi-Fi connection records from the historical Wi-Fi connection data comprises:

obtaining, from a scan result, information of NAPs each having a null SSID, wherein N is a positive integer; and determining, according to the information of the NAPs, the M Wi-Fi connection records from the historical Wi-Fi connection data.

3. The method of claim 2, wherein determining, according to the information of the NAPs, the M Wi-Fi connection records from the historical Wi-Fi connection data comprises:

selecting, from the historical Wi-Fi connection data, A Wi-Fi connection records each containing an AP previously connected by the terminal, wherein A is an integer equal to or larger than M; and determining, from the A Wi-Fi connection records, M Wi-Fi connection records each containing the same basic service set identifier (BSSID) and the same encryption mode for the BSSID as one of the N APs.

4. The method of claim 1, wherein the X parameters further comprise a first target encryption mode and a first target password; and determining, according to the current network environment information, the M Wi-Fi connection records from the historical Wi-Fi connection data comprises:

obtaining a current position of the terminal;

determining P Wi-Fi connection records from the historical Wi-Fi connection data, wherein each of the P Wi-Fi connection records contains a position of the terminal and an AP previously connected by the terminal, wherein the position of the terminal in each of the P Wi-Fi connection records falls within a preset range with the current position as a center, and P is a positive integer equal to or larger than M; and selecting the M Wi-Fi connection records from the P Wi-Fi connection records, wherein each of the M Wi-Fi connection records contains the first target encryption mode and the first target password.

5. The method of claim 4, further comprising:

obtaining the current position through a global positioning system or a Wi-Fi positioning technology.

6. The method of claim 1, wherein the X parameters further comprise a second target encryption mode and a second target password; and determining, according to the current network environment information, the M Wi-Fi connection records from the historical Wi-Fi connection data comprises:

obtaining information of B APs scanned, wherein each of the B APs has a signal strength value higher than a preset threshold, and B is a positive integer;

determining, from the historical Wi-Fi connection data, Q Wi-Fi connection records each containing an AP previously connected by the terminal, wherein each of the Q Wi-Fi connection records contains at least T BSSIDs of the B APs, wherein T is a positive integer smaller than or equal to B; and selecting the M Wi-Fi connection records from the Q Wi-Fi connection records, wherein for each of the M Wi-Fi connection records the AP previously connected by the terminal has an encryption mode the same as the second target encryption mode, and a password the same as the second target password.

7. The method of claim 1, further comprising:

matching each character of the target SSID with each character of each of the SSIDs in the M Wi-Fi connection records.

8. A terminal, comprising:

at least one processor; and a computer readable storage, coupled to the at least one processor and storing at least one computer executable instruction thereon which, when executed by the at least one processor, causes the at least one processor to carry out actions, comprising:

obtaining X parameters of a target access point (AP), the X parameters at least comprising a target service set identifier (SSID) of the target AP, and X being a positive integer;

performing wireless fidelity (Wi-Fi) scan according to the X parameters;

determining, according to current network environment information, M Wi-Fi connection records from historical Wi-Fi connection data in response to unsuccessful finding of the target AP, each of the M Wi-Fi connection records containing an AP previously connected by the terminal, and M being a positive integer; and performing Wi-Fi scan according to the target SSID and SSIDs in the M Wi-Fi connection records;

wherein the at least one processor configured to carry out performing the Wi-Fi scan according to the target SSID and the SSIDs in the M Wi-Fi connection records is configured to carry out actions, comprising:

matching the target SSID with each of the SSIDs in the M Wi-Fi connection records to obtain M matching values;

determining a scan priority sequence of the M Wi-Fi connection records according to the M matching values; and performing the Wi-Fi scan according to the scan priority sequence and the M Wi-Fi connection records.

9. The terminal of claim 8, wherein the at least one processor configured to carry out determining, according to the current network environment information, the M Wi-Fi connection records from the historical Wi-Fi connection data is configured to carry out actions, comprising:

obtaining, from a scan result, information of NAPs each having a null SSID, wherein N is a positive integer; and
determining, according to the information of the NAPs, the M Wi-Fi connection records from the historical Wi-Fi connection data.

10. The terminal of claim 9, wherein the at least one processor configured to carry out determining, according to the information of the N APs, the M Wi-Fi connection records from the historical Wi-Fi connection data is configured to carry out actions, comprising:
selecting, from the historical Wi-Fi connection data, A Wi-Fi connection records each containing an AP previously connected by the terminal, wherein A is an integer equal to or larger than M; and
determining, from the A Wi-Fi connection records, M Wi-Fi connection records each containing the same basic service set identifier (BSSID) and the same encryption mode for the BSSID as one of the N APs.

11. The terminal of claim 8, wherein the at least one processor configured to carry out determining, according to the current network environment information, the M Wi-Fi connection records from the historical Wi-Fi connection data is configured to carry out actions, comprising:
obtaining a current position of the terminal;
determining P Wi-Fi connection records from the historical Wi-Fi connection data, wherein each of the P Wi-Fi connection records contains a position of the terminal and an AP previously connected by the terminal, wherein the position of the terminal in each of the P Wi-Fi connection records falls within a preset range with the current position of the terminal as a center, and P is a positive integer equal to or larger than M; and
selecting the M Wi-Fi connection records from the P Wi-Fi connection records, wherein the X parameters further comprise a first target encryption mode and a first target password, each of the M Wi-Fi connection records contains the first target encryption mode and the first target password.

12. The terminal of claim 11, wherein the at least one processor is further configured to carry out an action, comprising:
obtaining the current position of the terminal through a global positioning system or a Wi-Fi positioning technology.

13. The terminal of claim 8, wherein the at least one processor configured to carry out determining, according to the current network environment information, the M Wi-Fi connection records from the historical Wi-Fi connection data is configured to carry out actions, comprising:
obtaining information of B APs scanned, wherein each of the B APs has a signal strength value higher than a preset threshold, and B is a positive integer;
determining, from the historical Wi-Fi connection data, Q Wi-Fi connection records each containing an AP previously connected by the terminal, wherein each of the Q Wi-Fi connection records contains at least T BSSIDs of the B APs, wherein T is a positive integer smaller than or equal to B; and
selecting the M Wi-Fi connection records from the Q Wi-Fi connection records, wherein the X parameters further comprise a second target encryption mode and a second target password, for each of the M Wi-Fi connection records the AP previously connected by the terminal has an encryption mode the same as the second target encryption mode, and a password the same as the second target password.

14. The terminal of claim 8, wherein the at least one processor is further configured to carry out an action, comprising:
matching each character of the target SSID with each character of each of the SSIDs in the M Wi-Fi connection records.

15. A non-transitory computer readable storage medium storing at least one computer program which, when executed by at least one processor, causes the at least one processor to carry out actions, comprising:
obtaining X parameters of a target access point (AP), the X parameters at least comprising a target service set identifier (SSID) of the target AP, and X being a positive integer;
performing Wi-Fi scan according to the X parameters;
determining, according to current network environment information, M Wi-Fi connection records from historical Wi-Fi connection data in response to unsuccessful finding of the target AP, each of the M Wi-Fi connection records containing an AP previously connected by a terminal, and M being a positive integer; and
performing Wi-Fi scan according to the target SSID and SSIDs in the M Wi-Fi connection records;
wherein the X parameters further comprise a second target encryption mode and a second target password, and determining, according to the current network environment information, the M Wi-Fi connection records from the historical Wi-Fi connection data comprises:
obtaining information of B APs scanned, wherein each of the B APs has a signal strength value higher than a preset threshold, and B is a positive integer;
determining, from the historical Wi-Fi connection data, Q Wi-Fi connection records each containing an AP previously connected by the terminal, wherein each of the Q Wi-Fi connection records contains at least T BSSIDs of the B APs, wherein T is a positive integer smaller than or equal to B; and
selecting the M Wi-Fi connection records from the Q Wi-Fi connection records, wherein for each of the M Wi-Fi connection records the AP previously connected by the terminal has an encryption mode the same as the second target encryption mode, and a password the same as the second target password.

16. The non-transitory computer readable storage medium of claim 15, wherein the at least one computer program executed by the at least one processor to carry out the action of performing the Wi-Fi scan according to the target SSID and the SSIDs in the M Wi-Fi connection records is executed by the at least one processor to carry out actions, comprising:
matching the target SSID with each of the SSIDs in the M Wi-Fi connection records to obtain M matching values;
determining a scan priority sequence of the M Wi-Fi connection records according to the M matching values; and
performing the Wi-Fi scan according to the scan priority sequence and the M Wi-Fi connection records.

17. The non-transitory computer readable storage medium of claim 16, wherein the at least one computer program is further executed by the at least one processor to carry out actions, comprising:
matching each character of the target SSID with each character of each of the SSIDs in the M Wi-Fi connection records.

18. The non-transitory computer readable storage medium of claim 15, wherein the at least one computer program executed by the at least one processor to carry out the action of performing the Wi-Fi scan according to the target SSID and the SSIDs in the M Wi-Fi connection records is executed by the at least one processor to carry out actions, comprising:

matching the target SSID with each of the SSIDs in the M Wi-Fi connection records to obtain a target Wi-Fi connection record; and performing the Wi-Fi scan according to the target Wi-Fi connection record.

\* \* \* \* \*